UNITED STATES PATENT OFFICE.

JOHN I. WATTS AND WILLIAM A. RICHARDS, OF SANDBACH, COUNTY OF CHESTER, ENGLAND.

PROCESS OF MAKING A SODIUM SALT.

SPECIFICATION forming part of Letters Patent No. 399,176, dated March 5, 1889.

Original application filed July 5, 1887, Serial No. 243,349. Divided and this application filed November 26, 1888. Serial No. 291,890. (No specimens.) Patented in England October 12, 1886, No. 13,001; in France June 30, 1887, No. 184,551; in Belgium June 30, 1887, No. 78,022, and in Germany July 12, 1887, No. 43,583.

*To all whom it may concern:*

Be it known that we, JOHN ISAAC WATTS and WILLIAM ARMSTRONG RICHARDS, subjects of the Queen of Great Britain, residing at Sandbach, in the county of Chester, in the Kingdom of England, have invented certain new and useful Improvements in the Manufacture of a Sodium Product, the same being a division of an application filed July 5, 1887, Serial No. 243,349, (for which we have received Letters Patent in England, No. 13,001, dated October 12, 1886; in France, No. 184,551, dated June 30, 1887; in Belgium, No. 78,022, dated June 30, 1887, and in Germany, No. 43,583, dated July 12, 1887,) of which the following is a specification.

This invention has for its object the production of a new article of manufacture, which we call "sesquicarbonate of soda," and which is composed mainly of one equivalent of bicarbonate of soda, one equivalent of monocarbonate of soda, and two equivalents of water in chemical combination, ($Na_2CO_3$ $NaHCO_3 2H_2O$.)

Our method of manufacturing this salt consists in forming an aqueous solution containing three equivalents of soda to four (or between three and four) equivalents of carbonic acid, and crystallizing out at a temperature not below 35° centigrade. There are several different methods of obtaining the solution. We prefer to form it by treating bicarbonate of soda in such manner as to deprive it of about one-third of its carbonic acid, or by mixing it in solution with a chemically-equivalent quantity of monocarbonate of soda. The monocarbonate can be a little in excess, but not the bicarbonate, or the excess of bicarbonate will be found in the product.

In carrying the invention into practice we have found the following methods of preparing the solution all cheap and practicable. We give them in the order in which we prefer them.

(*a*) We heat bicarbonate of soda by any well-known means in such a manner as to deprive it of about one-third of its carbonic acid, and then dissolve the salt thus treated in hot water; (*b*) or to a solution of monocarbonate of soda we add the equivalent quantity of bicarbonate of soda—that is, about eighty-four parts of bicarbonate of soda are added to about every one hundred and six parts of monocarbonate of soda; (*c*) or we boil bicarbonate of soda with water until one-third of the carbonic acid is given off; (*d*) or we treat bicarbonate of soda with caustic alkali sufficient to form the requisite amount of monocarbonate of soda to combine with the remaining carbonate of soda in the proportion of about one hundred and six parts of monocarbonate to eighty-four parts of bicarbonate; (*e*) or we heat bicarbonate of soda in solution with the oxide of any alkaline earth in sufficient quantity to combine with about one-third of the carbonic acid present. Besides the alkaline earths there are other substances that will unite with carbonic acid that could be used for this purpose; but except in the rare case where it is desired to form a special carbonate in this way and obtain the sesquicarbonate as a by-product they are too expensive for commercial use, so it is needless to enumerate them.

The solution obtained by any of these methods is clarified, if necessary, and slowly cooled, preferably while it is kept agitated, when the sesquicarbonate crystallizes out; but the temperature of the solution must not be allowed to fall below 35° centigrade, as below this temperature other carbonates of soda crystallize out from the liquor. If the solution as obtained is not fully saturated, it can be concentrated by evaporation before submitting it to crystallization. Sodium chloride can be added to the solution to accelerate the crystallization, if desired.

In cases where sodium chloride is not added the mother liquor can be used in subsequent operations instead of water.

The sesquicarbonate of soda is obtained in the form of distinct crystals, and can be separated from the mother liquor and dried by filter-presses, hydro-extractors, or any other well-known means.

Having now particularly described and ascertained the nature of the said invention and in what manner the same is to be performed, we declare that we are aware that a native crystalline substance has been found in an impure form, called "sesquicarbonate of soda," and that it has been known as a scientific fact that under certain circumstances a crystalline carbonate of soda has been formed, differing from both sodium monocarbonate and sodium bicarbonate in the proportions of carbonic acid and soda found therein; but these substances differ materially in chemical composition from the product manufactured by our process, for while, according to the best authorities, the substance which has hitherto been known contains three equivalents of carbonic acid to two equivalents of soda, our compound contains four equivalents of carbonic acid to three equivalents of soda. Our new compound, therefore, contains considerably less bicarbonate of soda, and is consequently much more valuable for numerous industrial purposes. We have, without hesitation, given it commercially the same name, (sesquicarbonate of soda,) because the product previously prepared has never been made on a large scale, and is not now an article of commerce.

We claim as our invention—

The process of manufacturing the said salt by preparing an aqueous solution containing not less than three equivalents of soda ($Na_2O$) to four equivalents of carbonic acid ($CO_2$), and causing the salt ($Na_3H_2CO_3 + 2H_2O$) to crystallize from it at a temperature above 35° centigrade, substantially as herein described.

In testimony whereof we have signed our names to this specification in the presence of two subscribing witnesses.

JOHN I. WATTS.
W. A. RICHARDS.

Witnesses:
WM. P. THOMPSON,
GEO. C. DYMOND.